July 11, 1961     J. F. BOEHM     2,991,915
SPRING ACTUATED THREADED FOLLOWER TYPE DISPENSER FOR CREAM JARS
Filed Oct. 13, 1958
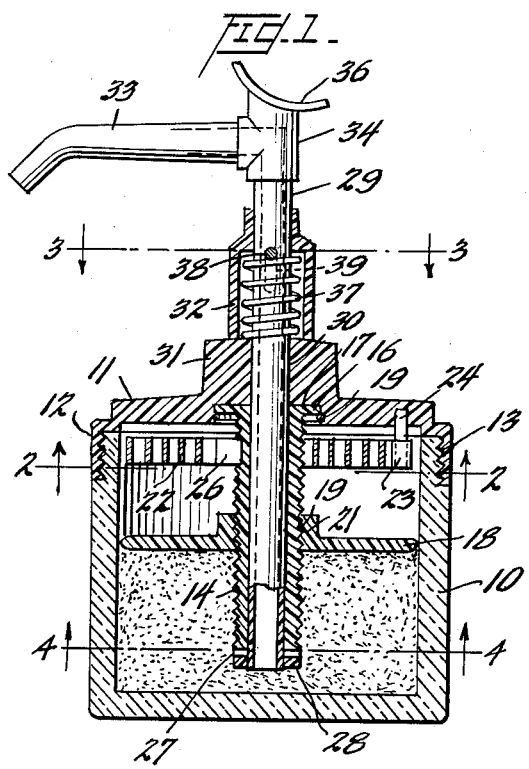
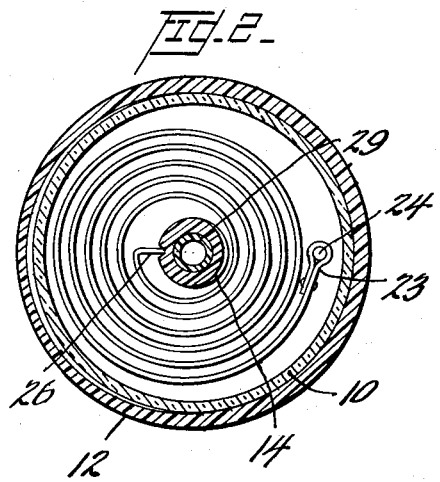
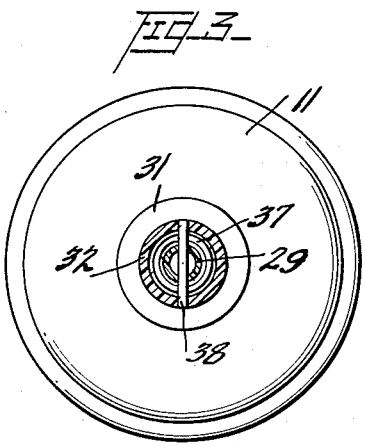
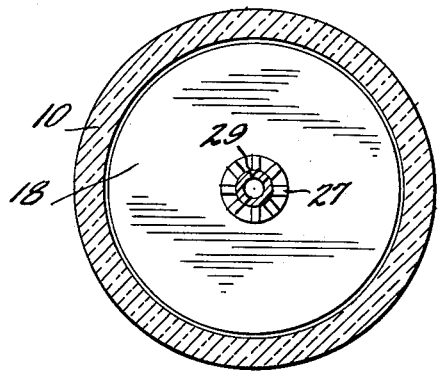
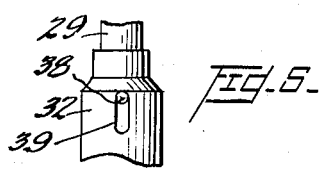
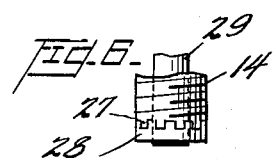
INVENTOR,
John F. Boehm.
BY Nelson, Cole, Grindle & Watson,
ATTORNEYS.

United States Patent Office 2,991,915
Patented July 11, 1961

2,991,915
SPRING ACTUATED THREADED FOLLOWER TYPE DISPENSER FOR CREAM JARS
John F. Boehm, Cincinnati, Ohio, assignor to The Drackett Company, Cincinnati, Ohio, a corporation of Ohio
Filed Oct. 13, 1958, Ser. No. 766,954
8 Claims. (Cl. 222—320)

This invention relates to improvements in a cream jar dispensing unit of the class in which a follower or piston within the jar is threaded on a central discharge tube depending from the jar cap for movement toward the bottom of the jar responsive to rotation of the tube.

Dispensing units of this general type, as heretofore known, have required manually operable means of one sort or another for production of the required rotary movement of the threaded discharge tube.

It is, however, the object of the present invention to provide such a dispensing unit in which the energy for producing the rotary movement of the threaded tube is stored in a suitable spring or other energy-storing device and released as desired through a manually controllable braking or holding mechanism.

It is a further object to provide such a unit in which the stored energy may be utilized in an accurately controlled manner to expel all or any desired portion of the jar contents. Normally, the dispenser will be used to repeatedly expel small portions of the jar contents.

The foregoing objects and advantages are achieved by directly connecting the energy-storing device in rotary driving relation to the threaded discharge tube which drives the piston and by providing a braking or holding device normally engaging and preventing rotation of the discharge tube but adapted to be disengaged manually from the jar exterior.

It is also a feature of the invention to provide such a holding device which will automatically re-engage with the threaded tube and interrupt its rotation whenever the manual pressure on same is released.

The foregoing features and advantages are all attainable by the preferred embodiment of the invention illustrated in the accompanying drawings in which:

FIGURE 1 represents an axial cross-section through a generally cylindrical cream jar having the dispensing device of the invention applied thereto.

FIGURE 2 is a cross-section on the line 2—2 of FIGURE 1;

FIGURE 3 is a section on the line 3—3 of FIGURE 1;

FIGURE 4 is a section on the line 4—4 of FIGURE 1;

FIGURE 5 is a detailed fragmentary side elevation showing certain details of the spring housing and guide means for the dispensing tube; and FIGURE 6 is a detail elevational view of the braking or holding means of the invention.

Referring now in detail to the accompanying drawings, the reference character 10 designates the usual generally cylindrical cream jar defining a cylindrical cavity therein and having a cap or closure 11 formed with a conventional threaded skirt 12 which is removably secured in the usual manner on the threaded upper end portion 13 of the jar. Rotatably supported preferably coaxially to the jar and its cap 11 is an externally threaded tube 14 which is supported by the cap with its depending lower end spaced slightly above the bottom of the jar.

Any suitable means may be provided for, thus rotatingly supporting the tube 14. The means shown by way of exemplification consists in forming the tube at its upper end with a radial flange 16 which is rotatably seated in a circular recess 17 opening downwardly from the bottom of the cap 11. The flange is secured in this socket by snap ring 19 in a manner to permit free rotation of the threaded tube 14.

Threaded on the tube 14 within the jar is the follower or piston 18, which is preferably provided with an upstanding thickened portion or annular boss 21 surrounding its threaded opening to provide an increased area of engagement with the tube 14 and to resist tilting of the piston 18. The piston conforms in cross-sectional size and shape with the interior dimensions of the jar so that it is in snug peripheral engagement with the interior sidewalls of the jar and will thus prevent the escape of the jar contents between the piston and the sidewalls as the piston moves downwardly.

For rotating the tube 14 in a direction to cause downward movement of the piston 18, there is provided a suitable energy-storing means exemplified as a more or less usual coilspring 22 which is disposed within the skirt of the cap 11 at the upper end of the jar and which lies in a radial plane of the jar. It will be seen that this spring is connected between the jar cap 11 and the tube 14 in a manner to exert a resilient torque on the tube, the outer end of the spring being formed with a loop 23 which is secured around an anchor pin 24 depending from the cap 11. At its inner end the spring is provided with a radial anchoring portion 26 which is embedded in the sidewall of the tube 14 or otherwise suitably secured thereto.

It will be understood that the spring 22 will normally be wound tight by rotation of the tube 14 and that the piston 18 will normally be positioned at the upper end of the tube when the dispenser is inserted in a jar so that the spring-driven tube 14 may urge the piston thereafter toward the bottom of the jar.

In order to normally maintain the tube 29 against rotation, there is provided a braking or holding means which may conveniently assume the form of a dog clutch 27 formed with downwardly directed dogs or serrations at the lower end of the tube 14.

A cooperating holding means or dog clutch 28 is preferably fixedly carried at the lower end of a dispensing tube 29 which is slidably axially disposed within the tube 14 and which is freely rotatably associated with the tube 14. The upper end of the tube 29 projects outwardly and upwardly through an opening 30 in a thickened cylindrical collar 31 of the cap. It will be seen that the tube 29 also extends upwardly through a spring housing 32 the downwardly opening lower end of which is cemented or otherwise fixed to the collar 31 and at its upper end the tube 29 communicates with a discharge spout 33 through an elbow fitting 34 which will preferably be formed with an upwardly disposed finger piece 36 to facilitate manual depression of the dispensing tube 29. The discharge spout 33 preferably will project in a generally radial direction with regard to the jar and the tube 29 as shown.

For resiliently urging the tube 29 upwardly to engage the holding means 27 and 28, there may be provided a coil spring 37 within the housing 32, the spring being disposed coaxially about the tube 29 and under compression between the collar 31 at the bottom of the housing 32 and the projecting ends of a pin 38 disposed diametrically through the tube 29.

The pin 38 may also be conveniently utilized to prevent rotation of the tube 29 as is essential in order to render the holding means operative, while permitting a sufficient range of axial or vertical movement of the tube to permit the release and reengagement of the holding means. To this end the housing 32 may be provided with diametrically opposed vertical slots 39 in the sidewalls for guiding reception of the opposite ends of the pin 38. This latter arrangement is best shown, FIGURE 5 of the drawings considered in conjunction with FIGURE 1.

In the operation of the mechanism above described, it will be apparent that the dispensing device and its associated cap 11 may be applied to a usual cream jar in place of the usual closure cap of the jar. Before application, it will be understood that the spring 22 will be wound tight by relative rotation between the tube 14 and cap 11 in the proper direction and the piston 18 will be rotated or threaded upwardly on that tube to the uppermost limit of its permissible limit thereon. Then with the finger piece 36 released to permit engagement of the holding means 27 and 28 by pressure of the spring 37, the cap will be threaded onto the top of the jar. Obviously as the cap is thus applied the tube 27 will be inserted into the jar contents to the position shown in FIGURE 1 and the piston 18 will normally be caused to rest upon the upper surface of the contents of the jar. As is usual in such devices the piston 18 will be held against rotation in any suitable manner though for this purpose it will usually suffice to rely upon the engagement of the piston with the jar contents as well as the frictional peripheral engagement of the piston with the sidewalls of the jar itself.

Thereafter when it is desired to dispense any portion of the jar contents this may be readily accomplished by manually depressing the finger piece 36 of the tube 29 and holding this depressed for as long a period as desired while the tube 14 is rotated by the stored energy of spring 22 to drive the piston 18 downwardly. The resulting pressure on the cream contents of the jar forces same upwardly through the lower end of the tube 29 and outwardly through the spout 33 for reception in the hand of the user or in any suitable container, or if desired for application to any desired object. After the desired quantity of the jar contents is dispensed, the dispensing action may be readily discontinued merely by releasing the finger piece 36 and permitting the tube 29 to move upwardly under the action of spring 37 until the holding elements or means 27 and 28 are reengaged.

It will thus be seen that there is provided a dispensing unit which is actuated by stored energy in a manner somewhat analogous to that of the usual aerosol dispensers and yet which is simply and economically constructed of relatively few working parts.

In this application I have shown and described only the preferred embodiment of the invention simply by way of illustration of the preferred mode of carrying out the invention. However, it is recognized that the mechanism shown in the accompanying drawings is capable of various modifications and that its several details may be altered in various ways without departing from the invention. Accordingly, the drawings and description herein are to be considered as merely illustrative in nature and not as restrictive.

Having thus described the invention, what is claimed as new and desired to be secured by Letters Patent is:

1. A dispensing unit for cream and viscous liquids comprising a removable closure element for the upper end of a jar, an externally threaded tube depending from said closure element and fixedly axially connected thereto for free rotary movement, a piston threaded on said tube for rotation relative thereto, resilient energy storing means interconnected between said closure element and the threaded tube for exerting a constant resilient torque on the latter, said element having an opening therein coaxial with said tube, a dispensing tube extending through said opening and slidably coaxially disposed in said threaded tube to provide a discharge passage for material expelled from the jar, means on said closure element preventing rotary movement of said dispensing tube, and normally interengaged holding means on said respective tubes, said holding means being disengageable responsive to axial movement of said dispensing tube whereby said energy-storing means may rotate the said threaded tube.

2. A dispensing unit comprising an externally threaded tube, a piston threaded on said tube for rotation relative thereto, means supporting said tube for free rotation and against axial displacement, energy-storing means exerting a constant rotational force on said threaded tube, a dispensing tube extending coaxially into said threaded tube means restraining said dispensing tube against rotary movement while permitting axial movement thereof in the threaded tube, normally interengaged holding means on the respective tubes securing them against relative rotation, said means being releasable responsive to relative axial movement of the tubes.

3. The combination of claim 2 in which said energy-storing means comprises a helical coil spring disposed coaxially around said threaded tube, the opposite ends of said spring being anchored to said tube and to said supporting means respectively.

4. A dispensing unit for cream jars comprising a centrally apertured jar and closure, an externally threaded tube depending in fixed axial relation from the closure in registry with said aperture and freely rotatable relative to said closure, a piston threaded on said tube for rotation relative thereto, a dispensing tube telescopically disposed through said threaded tube with its upper end projecting through said aperture, the lower end of said dispensing tube projecting below that of said threaded tube, said threaded tube terminating in a downwardly directed braking means, the downwardly projecting end portion of said dispensing tube carrying braking means beneath said first mentioned braking means for axial movement to and from operative engagement with said first mentioned braking means, means on said closure preventing rotary movement of said dispensing tube, and energy-storing means carried by said closure for exerting a constant rotational force on said threaded tube.

5. The combination of claim 4 including spring means acting between said closure and the dispensing tube to urge said braking means into operative engagement, and a discharge spout carried by said dispensing tube in communication therewith.

6. A dispensing unit comprising an externally threaded tube, means supporting said tube for free rotation, a dispensing tube telescopically communicating with said threaded tube, resilient spring means interconnected between said tubes for imparting a rotational force to said threaded tube, said tubes being relatively axially movable, and braking means carried by the respective tubes for engagement and disengagement responsive to relative axial movement of the tubes in opposite directions respectively.

7. The combination of claim 6 including spring means urging said tubes in an axial direction to engage said braking means.

8. A dispensing unit comprising a cream jar of uniform interior cross-sectional dimensions throughout its depth, a piston conforming in cross-sectional dimensions to said jar interior, and operatively disposed for movement therein, said piston being formed with an internally threaded central bore therethrough, an externally threaded tube outwardly disposed through said bore in threaded engagement therewith, resilient energy storing means operatively connected to said tube and exerting a force tending to rotate it about its axis relative to said piston, and releasable holding means on said jar normally restraining the said tube against rotation.

References Cited in the file of this patent
UNITED STATES PATENTS

| | | |
|---|---|---|
| 589,965 | Gonorvsky | Sept. 14, 1897 |
| 1,736,644 | Bell | Nov. 19, 1929 |
| 2,599,071 | Schwarz | June 3, 1952 |
| 2,685,389 | Robbers | Aug. 3, 1954 |
| 2,732,101 | Sohn | Jan. 24, 1956 |